Aug. 28, 1962 P. C. TREXLER 3,051,164
JACKET ISOLATOR FOR USE IN STERILE TECHNIQUES
Filed Aug. 17, 1959 4 Sheets-Sheet 1
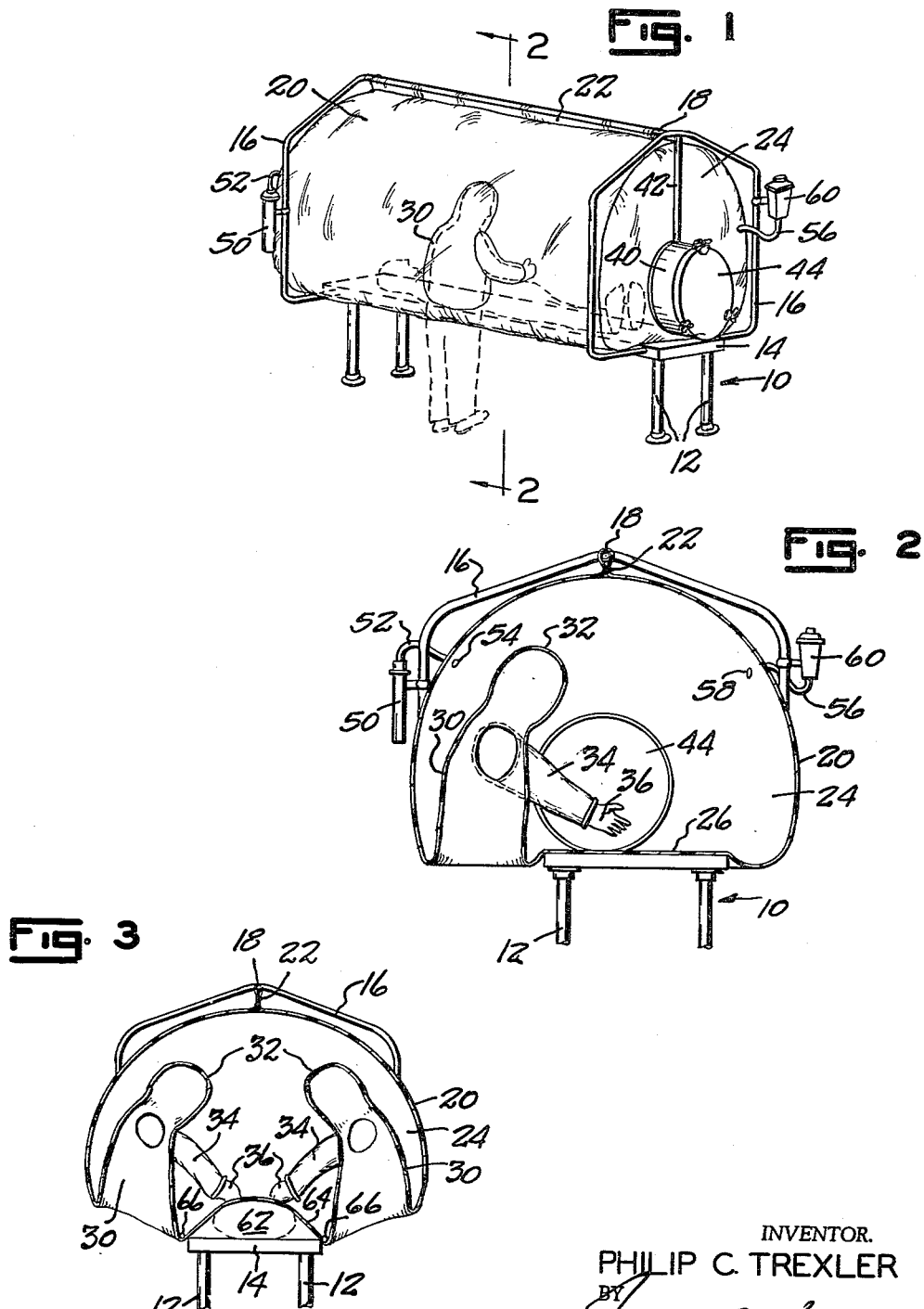
INVENTOR.
PHILIP C. TREXLER
BY
Eugene C. Knoblock
ATTORNEY Aug. 28, 1962 P. C. TREXLER 3,051,164
JACKET ISOLATOR FOR USE IN STERILE TECHNIQUES
Filed Aug. 17, 1959 4 Sheets-Sheet 2
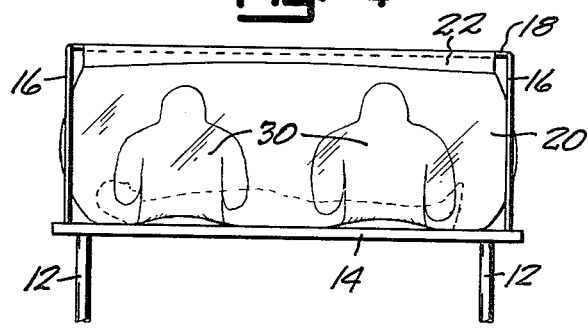
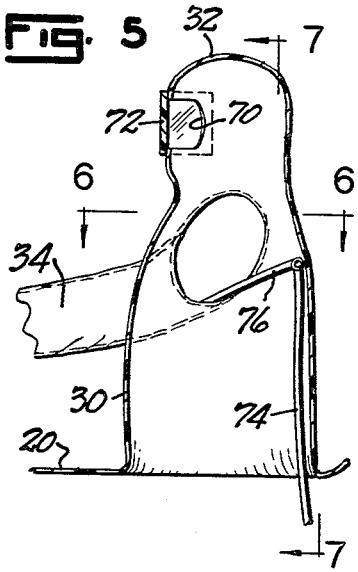
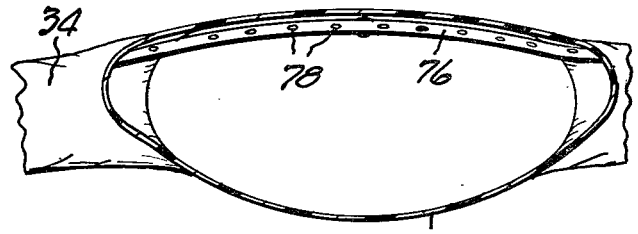
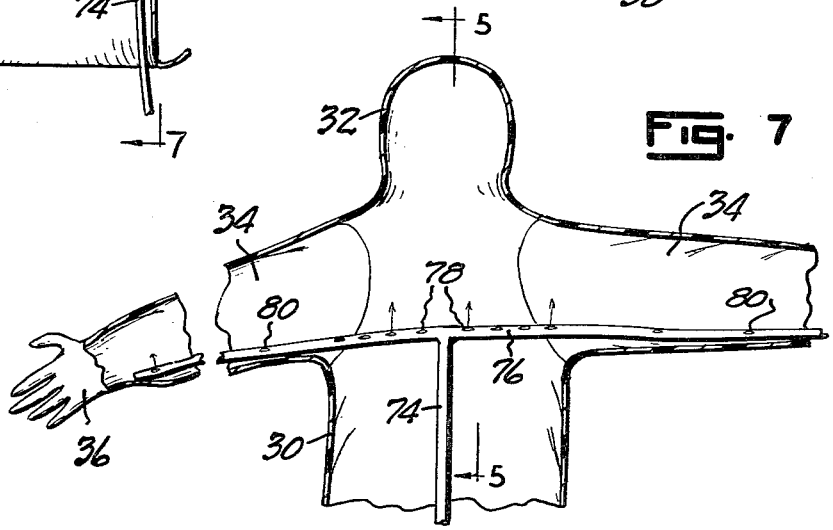
INVENTOR.
PHILIP C. TREXLER
BY
Eugene C. Knoblock
ATTORNEY Aug. 28, 1962 P. C. TREXLER 3,051,164
JACKET ISOLATOR FOR USE IN STERILE TECHNIQUES
Filed Aug. 17, 1959 4 Sheets-Sheet 3

INVENTOR.
PHILIP C. TREXLER
BY
Eugene C. Knoblock
ATTORNEY

Aug. 28, 1962 P. C. TREXLER 3,051,164
JACKET ISOLATOR FOR USE IN STERILE TECHNIQUES
Filed Aug. 17, 1959 4 Sheets-Sheet 4
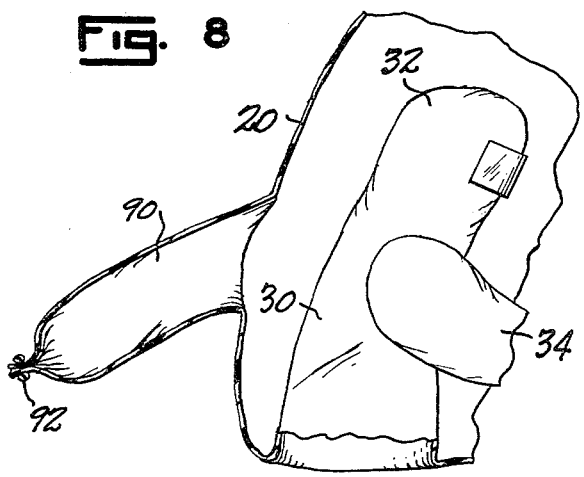
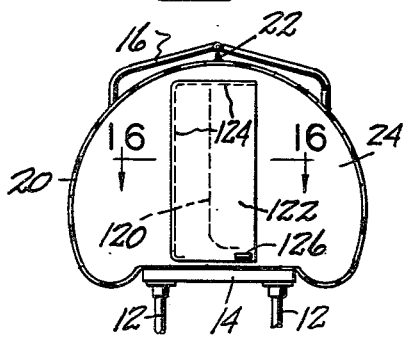
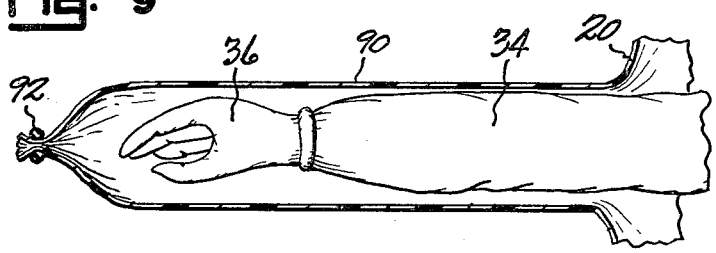
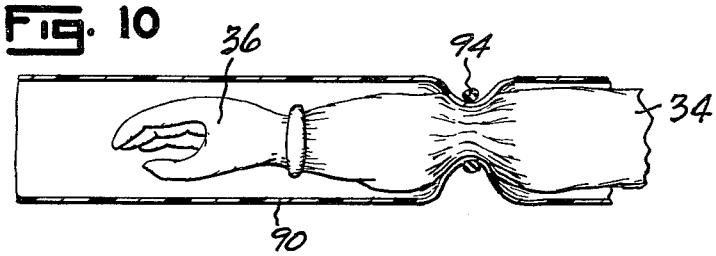
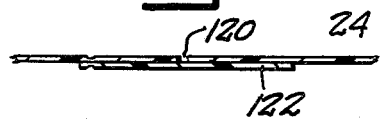
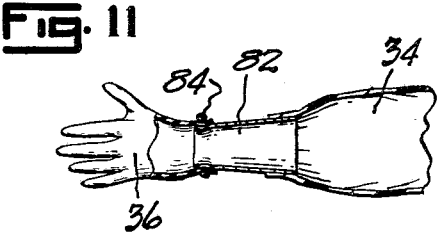
INVENTOR.
PHILIP C. TREXLER
BY
ATTORNEY

United States Patent Office 3,051,164
Patented Aug. 28, 1962

3,051,164
JACKET ISOLATOR FOR USE IN STERILE TECHNIQUES
Philip C. Trexler, Niles, Mich., assignor to University of Notre Dame du Lac, Notre Dame, Ind., a corporation of Indiana
Filed Aug. 17, 1959, Ser. No. 834,119
16 Claims. (Cl. 128—1)

This invention relates to a jacket isolator for use in sterile techniques.

At present, aseptic techniques, i.e., the exclusion of pathogens, is widely used in the treatment and care of patients with respect to infection. The aseptic technique is supplemented by the use of disinfectants, bacteriostatic agents and various procedures for augmenting the host defense system. With these methods most infectious diseases can be controlled with the exception of those that often establish a symbiotic relationship with the host.

With the widespread use of antibiotics and new methods of treatment, the organisms which establish a symbiotic relation with the host are of increasing importance.

The practice of aseptic techniques in hospitals, and particularly in and around operating rooms and in areas where problems of control of infection with patients suffering from burns and from radiation exist, is difficult. Thus the security of the system practicing aseptic techniques depends upon the careful cooperation of personnel ranging from the laundry and the cleaning staff to the physician and surgeon, that is, through the range of all persons concerned with hospital housekeeping, the flow of supplies, the handling of and attendance upon patients and the medical and surgical staff. Furthermore, present hospital practices require that a large space and area be maintained sterile, such as an entire operating room and adjoining areas, such as corridors and anterooms. However, even with the greatest care, it will be obvious that a surgical department cannot be maintained sterile assuredly where a number of operations are performed in the same operating room during the same day without an opportunity to sterilize the entire area between operations.

The use of a closed system for the maintenance of biological specimens wherein full control is provided to prevent infection of specimens has been known for many years. Examples of isolators useful in such systems are shown in the J. A. Reyniers Patent No. 2,244,082, dated June 3, 1941, my prior Patent No. 2,705,489, dated April 5, 1955, and my co-pending patent applications, Ser. No. 524,999, filed July 28, 1955, for Contamination Control Apparatus and Method, now abandoned, and Ser. No. 656,396, filed May 1, 1957, for Isolating Device. Essentially the closed system in each of the foregoing examples serves to limit the migration of organisms and thereby to avoid problems as exist in open systems and the discipline required in open systems with respect to aseptic techniques.

There are other fields in which sterile techniques and controls are required. Among these are the manual packaging of foods and of pharmaceuticals. In other fields, the control of dust and gases is important, as in the assembly and packaging of delicate instruments and electronic miniature and sub-miniature units. In each of these fields a closed system has advantages, but no available closed system has afforded the required flexibility and utility to bring about its acceptance and use.

The primary object of this invention is to make possible the advantages of a closed system in the surgery of a hospital or in areas in which control of infection with burn and radiation patients is required, and in fields requiring control of infection, of gases or of dust, as well as to provide certain improved features in closed systems for use with biological specimens.

A further object is to provide apparatus for maintaining a closed system, wherein impairment of observation and manipulation of a patient or specimen or work object is reduced to a minimum without sacrifice of the advantages of a closed system for protection against infection, dust, gas, etc.

A further object is to provide an isolator within which predetermined sterile and controlled conditions may be maintained with a jacket provided with a hood and gloves and projecting into the isolator and flexible to accommodate easy and rapid entry of an attendant into a jacket and withdrawal therefrom, without substantial impairment of movement of the attendant within the jacket and without danger or discomfort being experienced by the attendant within the jacket.

A further object is to provide a device of this character wherein the advantages of a closed system may be secured in performing surgery upon a patient located outside of the system.

A further object is to provide apparatus of this character which is inexpensive, light in weight, easily installed and removed, and which is disposable by incineration, so that it may be readily replaced by new apparatus in an operating room between operations in order that the last patient of the day in a surgery may have the same benefit of sterile and aseptic conditions as did the first one of the day.

A further object is to provide an apparatus of this character with novel means accommodating replacement of a surgeon's glove during surgery without destroying the aseptic and sterile conditions in the closed system and to provide for replacement of a jacket in an isolator without destroying the sterile conditions therein.

Other objects will be apparent from the following specification.

In the drawings:

FIG. 1 is a perspective view illustrating one embodiment of my invention;

FIG. 2 is a vertical transverse sectional view taken on line 2—2 of FIG. 1;

FIG. 3 is a vertical transverse sectional view similar to FIG. 2 but illustrating a modified embodiment of the invention;

FIG. 4 is a side view of a device illustrating another modified embodiment of the invention;

FIG. 5 is a vertical sectional view illustrating the jacket portion of the device and taken on line 5—5 of FIG. 7;

FIG. 6 is a transverse horizontal sectional view taken on line 6—6 of FIG. 5;

FIG. 7 is a fragmentary vertical sectional view taken on line 7—7 of FIG. 5;

FIG. 8 is a fragmentary vertical sectional view of a modified embodiment of the device;

FIG. 9 is a fragmentary sectional view illustrating one step in the procedure of using the device shown in FIG. 8 for the purpose of removing and replacing a glove;

FIG. 10 is a fragmentary sectional view illustrating another step in the procedure of removing a glove using the apparatus shown in FIG. 8;

FIG. 11 is a fragmentary view of a glove with parts shown in section;

FIG. 15 is a vertical transverse sectional view of the apparatus showing another embodiment thereof; and FIG. 16 is an enlarged fragmentary detail sectional view taken on line 16—16 of FIG. 15.

Figure 12:
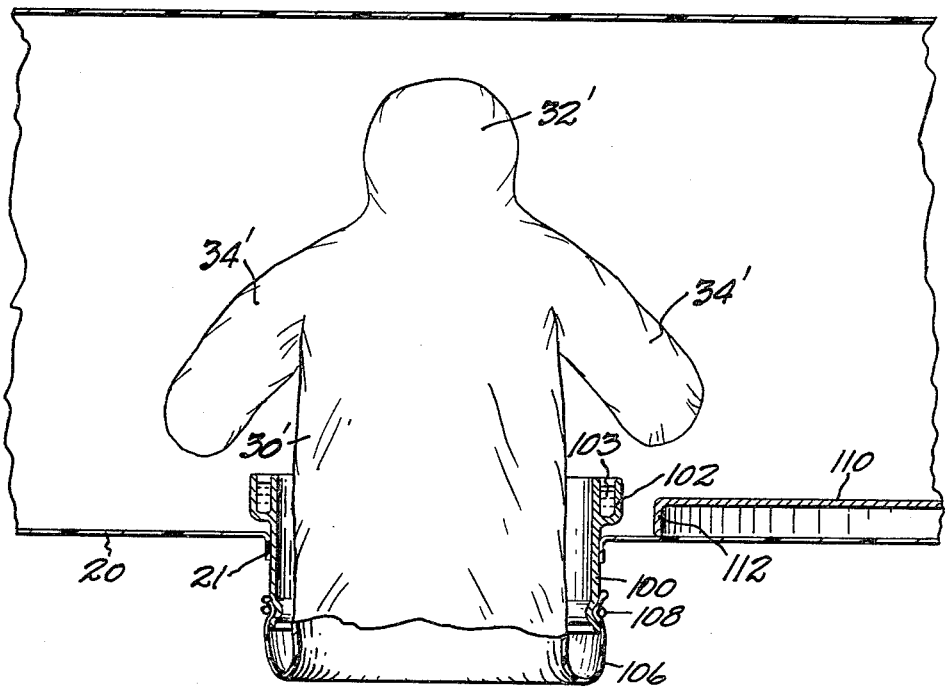
FIG. 12 is a fragmentary vertical sectional view illustrating another embodiment of the invention useful for detachably mounted a jocket.

Referring to the drawings which illustrate the preferred embodiments of the invention, and particularly to FIGS. 1 to 7 thereof, the numeral 10 designates a table having supporting legs 12 and a table top 14. The table top 14 may be of any suitable character to support thereon a surgical patient, a burned patient, a biological specimen, or work pieces. The table 10 preferably serves to support a framework for an enclosure. As here shown, the framework may comprise metal tubular end frame parts 16 of desired shape and size which are interconnected by a longitudinal upper bar 18 which preferably has a detachable connection (not shown) with at least one of the frame parts 16 at one end thereof to accommodate separation of parts 16 and 18.

An enclosure is supported by the frame. In one preferred form the enclosure is in the nature of a generally tubular body 20 of flexible film material supported by the frame member 18 as by means of a loop 22 extending lengthwise thereof and projecting thereabove, which fits removably around the frame member 18 to be supported and positioned thereby. The loop portion 22 will preferably be heat sealed or otherwise adhered to the tubular body 20 exteriorly thereof so that no leakage occurs at the joint between the body 20 and the loop 22. The envelope 20 is completed or closed by end members 24. The size of the envelope will preferably be such that the bottom portion 26 thereof may rest upon the table top 14, as illustrated in FIG. 2, and may project laterally therefrom. If desired, the enclosure may be formed wholly or partially from rigid material.

The enclosure parts 20, 24 are preferably formed from thin transparent film of which a variety of types is available and which is essentially airtight. Examples of films which are suitable include high density polyethylene, polypropylene, tetrafluoroethylene polymer, such as "Teflon X100," trifluorochloroethylene polymer, such as "Kel-F" and polyethylene terephthalate resin, such as "Mylar." The above named materials are all capable of being sterilized by steam, and the last three named can also be sterilized by dry heat at 350° F. Other films may be used in the fabrication of the enclosure of a type which are not sterilized by steam, and these include low density polyethylene, vinyl resin films, rubber hydrochloride films, such as "Pliofilm" and films of thermoplastic resins produced by the polymerization of vinylidene chloride, such as "Saran." It will be understood that the films specified above are cited as illustrative and are not intended to be limiting. The selection of the film will depend upon the character of use intended and the properties of film, such as clarity, ease of fabrication and bonding and elasticity.

The enclosure 20 has one or more openings in the lower portion thereof spaced laterally from the table 14 at each of which a jacket member 30 is connected. The connection of the jacket member provides a positive perimetral airtight seal between the same and the margin of the opening, with the jacket being open at its bottom, as best seen in FIGS. 2 and 3. The jacket includes a hood or head enclosing portion 32 and communicating arm portions 34 with which gloves 36 are detachably connected. The entire jacket with its hood, arms and gloves is airtight and provides means by which a physician, surgeon, nurse or other attendant may partially enter the enclosure 20, that is, from the waist up, in such a manner as to be able to manipulate freely specimens, instruments and other articles within the enclosure for the performance of surgical operations, for the care and treatment of a specimen, or for performing work upon a work piece, without risk of breaking the seal of the enclosure when the same is in sealed condition.

The enclosure will also have one or more openings therein for access to the interior thereof. For this purpose a construction as illustrated in FIGS. 1 and 2 may be provided, which consists of a tubular member 40 which may be supported from the table or the frame as by means of brace members 42 and which is provided at its opposite ends with releasable closure members 44, so as to define a lock. The lock will normally have both closures 44 thereof closed and, when it is desired to insert material into the enclosure 20, the outer closure 44 will be opened. Thereupon a sterilizing medium will be introduced into the lock after the outer closure has been reclosed. After sufficient time to permit the sterilizing medium to function, the inner closure can be opened and the sterilized material can be passed into the enclosure 20 in assured sterile condition.

The sterilizing means used with the device may be of any type found suitable. Thus, in some instances, steam may be used as the sterilizing agent for the enclosure 20 and the lock 40. In other instances, where the apparatus can be placed in an autoclave in order to obtain proper temperature, humidity and gas concentration, ethylene oxide may be used as a cold sterilizing agent. Under normal conditions, however, and particularly conditions where sterilization must occur during use of the unit, the preferred or most practical sterilizing agent would appear to be peracetic acid used in a two percent aqueous solution with a trace of nonionic wetting agent. This agent can be introduced into the lock by spray means (not shown). The enclosure 20 will also be provided with means (not shown) for permitting sterilization of the interior thereof, as by means of peracetic acid prior to use thereof. It will be understod that if a surface sterilant, such as peracetic acid, is used, everything that is sensitive to the agent must be wrapped in sterile condition in sealed packages with the peracetic acid then sterilizing the exterior of the sealed package, and the sealed package being opened only after it is taken into the enclosure 20 following such exterior sterilization.

The enclosure 20 is provided with an air supply which includes a blower (not shown) which may be mounted upon the frame 16 or table 14, preferably adjacent one end of the device, and which communicates with an air intake filter 50 which preferably comprises a chamber containing a filtering agent, such as glass wool, which filters micro organisms from air passed therethrough. A conduit or line 52 communicates with the outlet of the filter 50 and an opening 54 in the envelope, said communication being effected by airtight sealed joints. An outlet conduit 56 communicates with an outlet opening 58 in the enclosure and with an air outlet trap 60 which preferably is of the type which is normally closed or sealed but opens in response to a predetermined pressure differential between the interior of the enclosure and atmosphere for the purpose of exhausting air from the enclosure to atmosphere. The outlet trap will preferably operate in response to a pressure differential in the order of approximately one-quarter inch water column or any other selected pressure. Thus the pressure within the enclosure is low enough to insure that no injury to the specimen or patient within the enclosure will result from the pressure condition and at the same time there will be assurance that a change of filtered air free from micro organisms will occur with sufficient rapidity to satisfy the requirements of a biological specimen or a patient within the enclosure. It will be understood, however, that an outlet trap is not necessary in all cases. Thus the outlet may simply constitute a filter similar to inlet filter 50, such as a tube or duct of a cross-sectional dimension dependent on the desired rate of air flow therethrough, such as a duct of four inch diameter for air flow at the rate of 20 c.f.m., and containing glass wool or other filter material capable of excluding insects and of preventing eddy currents in which bacteria from the atmosphere could be carried into the enclosure.

In the arrangement shown in FIG. 2, a patient, specimen or work piece is located within the enclosure, and for this purpose the lock or opening 40 will be sufficiently large to permit the same to be passed therethrough after the chamber has been sterilized. It will be apparent that in this case the introduction of a patient or a biological specimen will prevent complete sterilization to the extent that the patient or the specimen might carry infection. The apparatus is effective, however, for the treatment of patients suffering from burns or from radiation or conditions in which they are particularly susceptible to outside infection. In such instances micro organisms which might produce such infection are excluded by the device after it is closed and placed in operation with the filtered air supply mentioned above. The apparatus may also be used for a patient undergoing surgery who is known to be suffering an infectious condition which is desired to confine.

The apparatus shown in FIG. 3 is in the form most commonly provided for surgery. In this case the body 62 of the patient rests upon the table 14 exteriorly of the enclosure and the bottom of the enclosure at 64 is draped over and covers the body of the patient, particularly at the area to be operated. This permits an anaesthetist to work outside of the enclosure. Any suitable means may be employed to hold the lap cloth portion 64 snug or tight to the body of the patient, and I have here shown an arrangement in which bars or other weight members 66 are positioned in the enclosure between the cloth portion 64 and the jacket portion 30 and serve to gravitally position the lap cloth portion 64. In surgery the lap cloth portion 64 is severed to provide an opening at which the incision is made in the patient, thus allowing full scope for the conduct of the operation while the portion of the lap cloth 64 surrounding the incision is in contact with the body of the patient. In this connection it may be mentioned that the slight positive air pressure within the enclosure serves to press the margin of the lap cloth around the incision against the body of the patient to maintain the desired seal and to prevent access by air borne micro-organisms to the incision.

The arrangement illustrated in FIG. 4 is particularly useful for surgical work and illustrates the use of two jackets arranged side by side and longitudinally spaced in the enclosure so as to make possible the grouping of a number of persons around a specimen. Thus, as many as four jackets may be provided, consisting of two sets of two jackets located at opposite sides of the device and making possible their use by surgeons, assistants, anaesthetists and nurses, each having full freedom of movement to perform his or her function.

FIGS. 5, 6, 7 and 11 illustrate the construction of a jacket particularly well suited for use with this apparatus. The jacket is preferably formed of plastic film of the character described, which is clear and transparent and of thin guage. The sealed hood portion may be provided with a sight opening 70 around which is marginally adhered a rigid or semi-rigid transparent member 72 which may provide greater visibilty than the film and which prevents the hood from being pressed against the face near the eyes by the positive air pressure within the enclosure. The opening will be so located that when the top of the hood 32 rests upon the top of the head of the wearer, the transparent member 72 will provide a wide range of vision.

In order that the wearer may be comfortable and may be provided with an assured supply of fresh air, a conduit 74 may be provided extending into the jacket 30 from the bottom open end thereof, preferably at the back thereof. Conduit 74 will be connected with a blower (not shown) operating at low pressure and low velocity. The conduit 74 will preferably be connected to a cross-conduit 76 at or adjacent the level of the shoulder of the jacket, whose opposite ends extend into the jacket sleeves 34, as illustrated in FIG. 7. The conduits 74 and 76 will be flexible and will be cemented or otherwise anchored to the back of the jacket adjacent the shoulders and sleeves. A plurality of openings 78 may be formed in cross-conduit 76 adjacent the center thereof, directed upwardly so as to discharge air upwardly in the direction of arrows as seen in FIG. 7 to flow around the head of the wearer and thus provide an assured source of air for breathing and a sufficient flow of air to avoid discomfort due to overheating. One or more openings 80 may be provided in the end portions of the cross-tube 76 located within the sleeves 34 to avoid excessive discomfort and perspiration.

One manner of mounting a glove 36 upon a jacket sleeve 34 to permit replacement thereof is illustrated in FIG. 11. In this construction, a wristlet 82 formed of a tube of rigid or semi-rigid material is cemented or otherwise united in a continuous peripheral seal with the free end of the sleeve 34. The wrist portion of the glove 36 fits around the opposite end of the wristlet 82 and is held in place constrictively by an elastic endless band 84, or by an adhesive tape or like means. In the case of an elastic band, the wristlet 82 may have a perimetral bead or groove serving to resist separation of the parts incident to a pull upon the glove, as in reaching during the use of the apparatus.

The mounting of glove 36 detachably upon sleeve 34, as illustrated in FIG. 11, accommodates the provision of means in the device to replace a glove without destroying the sealed condition of the apparatus, as in the case that a glove is torn or cut during surgery. In this construction the enclosure 20 is provided with an open ended sleeve member 90 adjacent each jacket, which sleeve member is normally extended by the air pressure in the enclosure 20 to substantially the position shown in FIG. 8 when the outer open end thereof is closed or sealed, as by means of a tie 92. The members 90 will be so located that the wearer of the jacket 30 whose glove has been torn or broken may swing his arm rearwardly into such member 90 to the position shown in FIG. 9. Thereupon, a nurse or other attendant outside of the apparatus may apply a tie 94 around the arm of the wearer and the member 90, substantially as shown in FIG. 10, spaced from the glove 36. Therepon the tie 92 may be removed to open the outer end of the tube 90 and provide access to the damaged glove 36 for renewal thereof and replacement. After replacement, the new glove 36 may be sterilized, as by peracetic acid, and the tie 92 reapplied to the end of the member 90, whereupon the tie 94 may be removed and the person may withdraw his arm from the member 90 and resume work with a new sterilized glove.

Figure 14:
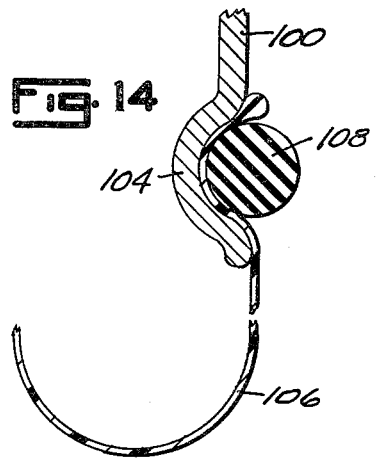
FIG. 14 is an enlarged fragmentary detail sectional view illustrating the connection of a jacket and an adaptor in the construction shown in FIG. 12.

It is also possible to provide a detachable mounting for a jacket with an arrangement which will permit a jacket to be replaced without opening the enclosure 20 to atmosphere. Such an arrangement is particularly well suited for use with apparatus wherein two or more jackets are mounted in the enclosure. In this construction a tubular member 100 is fixedly secured in sealed condition in an opening in the bottom of the enclosure 20, as by sealingly adhering a marginal portion 21 of said enclosure around said opening to an intermediate portion of tube 100. The upper part of the tube 100 will project into the enclosure 20 and is preferably provided with a continuous peripheral trough 102 containing a quantity of liquid 103. At its lower end spaced below the bottom of the enclosure 20 the member 100 will preferably be provided with a perimetral configured portion 104 defining a continuous restriction around the member 100 spaced from the lower free end thereof. A jacket 30' will have hood 32' and sleeves 34' mounting gloves (not shown) and may be constructed substantially similarly to the jackets described above with the exception that the jacket will be of a length to project through the tube 100 and will terminate in a skirt portion 106 projecting below the lower end of the tube 100. Skirt 106 is outwardly folded around the part 104 of the tube 100 and held in airtight sealed joint forming relation thereto by an endless elastic band 108, as illustrated in FIG. 14, or by an adhesive tape. The enclosure 20 will have available therein, at any suitable location adjacent to tube 100, a closure member 110 to span tube 100. Member 110 may have a perimetral flange 112 extending therefrom and of a diameter to fit freely within the groove 102 for immersion in the liquid 103 therein.

Figure 13:
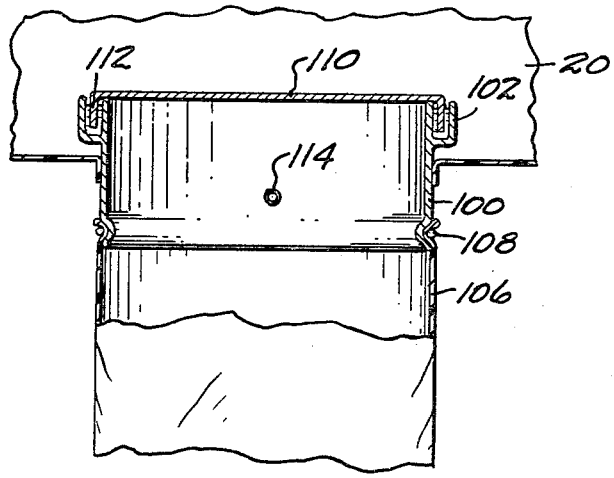
FIG. 13 is a fragmentary sectional view similar to FIG. 12 but illustrating another step in the procedure of using the device shown in FIG. 12 for the purpose of removing a jacket.

In use, assuming that the jacket 30' develops a tear or break during use thereof, the operator wearing it may free himself therefrom, pulling the jacket outwardly through the tube 100. Thereupon another operator can apply the closure 110 to span the tube 100 to the position shown in FIG. 13 so that a seal is effected at the upper end of tube 100. Thereupon the tie band or tape 108 can be removed from the tube 100, releasing the skirt portion 106 of the jacket and permitting substitution of another jacket by anchoring the skirt portion 106 by replacing the tie 108. Thereupon, a means for ejecting a spray of germicidal material, such as peracetic acid, may be applied at a fitting 114 in the tube 100 while the closure 110 remains in place, and germicidal solution may be injected into the tube 100 to sterilize the surfaces of the jacket which will be exposed to the atmosphere within the enclosure 20 upon reuse of the jacket. After a sufficient time has been allowed for effective action of the germicidal material, the closure 110 may be removed and the operator may enter the jacket and resume his work with assurance that the sterile condition in the enclosure has been maintained despite the change of the jacket.

The movement of materials across the sterile barrier of the closed system, as for the introduction of materials into the apparatus or the removal of materials from the interior of the apparatus, with minimum risk to the sterile condition of the closed system, may be accomplished in other ways than through the use of the locks 40 shown in FIG. 1 and described above. It will be understood that a split seam transfer method may be employed for this purpose similar to that illustrated and described in my copending application, Ser. No. 776,966, filed November 28, 1958. Still another access means is illustrated in FIG. 15 wherein end wall 24 of the enclosure may have a slit 120 therein, which slit may be substantially of L-shape as illustrated in FIG. 15. A closure flap 122 formed of film may be adhered, as by heat-sealing along the upper margin thereof and along one vertical margin thereof at 124, as seen in FIG. 15. The flap will be sufficiently large to project a substantial distance beyond the opening 120 and to contact the margins of the wall 24 around the opening 120 when pressed upon by the contained air pressure in the enclosure which is slightly higher than atmospheric pressure as explained above, and, therefore, tends to maintain the enclosure in inflated condition at all times. This produces a sealing flap construction comparable to a tent flap which can be opened for the passage of materials therethrough and which will reclose itself incident to the pressure internally thereof, as explained above. If desired, the flap 122 may carry a small weight 126 adjacent the free lower corner thereof,
as seen in FIG. 15, to insure that the flap will not take a fold which prevents its flat face contacting sealing engagement with the closure wall 24 incident to reclosing thereof. The flap arrangement provides a less effective seal than other arrangements but may be satisfactory in certain conditions by reason of the fact that air pressure acts outwardly so that opening of the flap accommodates only outward flow of air to atmosphere rather than flow of atmospheric air into the enclosure. In such instances sterilization of materials introduced into the unit would occur by dipping or spraying the same in a germicidal solution immediately prior to opening the flap and passing the article into the enclosure.

While the preferred embodiments of the invention have been illustrated and described, it will be understood that changes in the construction within the scope of the appended claims may be made without departing from the spirit of the invention.

I claim:

1. A jacket isolator comprising an enclosure, a support positioning said enclosure, said enclosure having an opening therein, a flexible jacket within said enclosure and having a sealed connection with said enclosure continuously around said opening, said jacket being imperforate and including a hood having a transparent portion and sleeves terminating in gloves, said enclosure being sealed and having a second opening adjacent to said jacket, an open ended tubular member sealingly connected at one end thereof to said enclosure continuously around said second opening and adapted to receive a jacket sleeve and glove therein, and releasable means for sealing the free end of said tubular member, said gloves being removably mounted on said jacket sleeves.

2. A jacket isolator comprising a support, an enclosure carried by said support and formed of flexible synthetic resin film, said enclosure having an opening therein, an imperforate jacket within said enclosure formed of flexible synthetic resin film and having a sealed connection with said enclosure continuously around said opening, said jacket including a hood having a transparent portion and sleeves terminating in gloves, said enclosure being sealed and including a tubular flexible portion projecting therefrom adjacent said jacket and adapted to receive a jacket sleeve and glove, and means releasably sealing the free end of said tubular enclosure portion, said gloves being releasably mounted on said jacket sleeves.

3. A jacket isolator comprising an enclosure, a support positioning said enclosure spaced above floor level, said enclosure having an opening in the lower part thereof alongside said support, means supplying air under pressure to said enclosure, a flexible jacket within said enclosure and having a sealed connection with said enclosure continuously around said opening, said jacket being imperforate and including a hood having a transparent portion and sleeves terminating in gloves, means supplying air to said jacket at lower pressure than in said enclosure, said sealed connection of jacket and enclosure including a tubular projection on said enclosure defining said opening, a portion of said jacket encircling said tubular projection, and means releasably anchoring said encircling jacket portion to said tubular projection.

4. A jacket isolator comprising an enclosure having a first opening therein and a normally closed access opening, means for positioning said enclosure, a flexible jacket within said enclosure and having a sealed connection with said enclosure continuously around said first opening, said jacket being imperforate and including a hood having a shape retaining transparent portion and sleeves terminating in gloves, means for circulating filtered air in said enclosure, and means for circulating air in said jacket and its hood, said first named air circulating means creating a pressure in said enclosure greater than the pressure created in said jacket by said last named air circulating means.

5. A jacket isolator comprising an enclosure, a table, means for stabilizing said enclosure relative to said table and spaced above floor level, said enclosure having an opening in the lower part thereof alongside said table, a flexible jacket within said closure and having a sealed connection with said enclosure continuously around said opening, said jacket being imperforate and including a hood having a transparent portion and sleeves terminating in gloves, means for supplying air to said hood, said enclosure being sealed, and means for circulating filtered air in said enclosure to maintain therein a pressure slightly above atmospheric pressure and above the air pressure in said hood.

6. A jacket isolator comprising an enclosure, a table, means for stabilizing said enclosure relative to said table and spaced above floor level, said enclosure having an opening in the lower part thereof alongside said table, a flexible jacket within said enclosure and having a sealed connection with said enclosure continuously around said opening, said jacket being imperforate and including a hood having a shape-retaining transparent portion and sleeves terminating in gloves, said enclosure being sealed, an air supply for said enclosure including a blower and a filter, an air outlet containing a filter and maintaining a predetermined excess of pressure above atmospheric pressure in said enclosure, and means for circulating air in said jacket at a pressure less than the pressure in said enclosure.

7. A jacket isolator comprising an enclosure, a table, means stabilizing said enclosure relative to said table, said enclosure having an opening therein, a flexible jacket within said enclosure and having a sealed connection with said enclosure continuously around said opening, said jacket being imperforate and including a hood having a transparent portion and sleeves terminating in gloves, means for discharging air into said jacket, and means for circulating air in said enclosure at a pressure above atmosphere and greater than air pressure in said hood.

8. A jacket isolator comprising an enclosure, a table, a support position said enclosure relative to said table, said enclosure having an opening therein, a flexible jacket within said enclosure and having a sealed connection with said enclosure continuously around said opening, said jacket being imperforate and including a hood having a transparent portion and sleeves terminating in gloves, air supply means for said jacket including a blower and a flexible conduit connected to said blower and extending into said jacket to discharge air adjacent to said hood, and means for supplying air to said enclosure under pressure greater than the pressure in said hood.

9. A jacket isolator comprising an enclosure, a table, a support positioning said enclosure relative to said table, said enclosure having an opening, a flexible jacket within said enclosure and having a sealed connection with said enclosure continuously around said opening, said jacket being imperforate and including a hood having a shape-retaining transparent portion and sleeves terminating in gloves, means for circulating air in said enclosure, air supply means for said jacket including a blower and a flexible conduit connected to said blower and including a T-shaped portion within said jacket and extending into said sleeves, said T-shaped conduit portion having a plurality of openings therein including an opening adjacent said hood and an opening within each sleeve, the air pressure in said enclosure being greater than the pressure in said jacket.

10. A jacket isolator comprising an enclosure, a table, a support positioning said enclosure relative to said table, said enclosure having an opening, a flexible jacket within said enclosure and having a sealed connection with said enclosure continuously around said opening, said jacket being imperforate and including a hood having a transparent portion and sleeves terminating in gloves, means for supplying air to said hood, said enclosure being sealed and including a transparent flexible, severable portion adapted to contact and at least partly cover the body of a patient resting on said table, and means for circulating filtered air in said enclosure at a pressure slightly above atmospheric pressure and greater than the pressure in said hood.

11. A jacket isolator comprising an enclosure, means for supplying air to said enclosure at a pressure above atmosphere, a table, means stabilizing said enclosure relative to said table, said enclosure having an opening, a flexible jacket within said enclosure and having a sealed connection with said enclosure continuously around said opening, said jacket being imperforate and including a hood having a transparent portion and sleeves terminating in gloves, means for supplying air to said jacket, said enclosure being sealed and including a transparent flexible, severable portion adapted to cover at least part of the body of a patient resting on said table, and means for holding said severable enclosure portion in contact with said body.

12. A jacket isolator comprising an enclosure, means for supplying air to said enclosure at a pressure above atmosphere, a support positioning said enclosure spaced above floor level, said enclosure having an opening in the lower part thereof alongside said support, a flexible jacket within said enclosure and having a sealed connection with said enclosure continuously around said opening, said jacket being imperforate and including a hood having a transparent portion and sleeves terminating in gloves, means for supplying air to the interior of said jacket, said support including an operating table, said enclosure being sealed and including a transparent flexible, severable portion adapted to cover at least part of the body of a patient resting on said table, and means for maintaining said severable enclosure portion in contact with said body.

13. A jacket isolator comprising an enclosure, means positioning said enclosure, said enclosure having an opening therein, a flexible jacket within said closure and having a sealed connection with said enclosure continuously around said opening, said jacket being imperforate and including a hood and sleeves terminating in gloves, means supplying air to said jacket, said enclosure having normally closed access openings, and means for circulating filtered air in said enclosure at a pressure slightly above atmospheric pressure, said hood having a transparent portion at least partially rigid to resist deforming thereof by air pressure within said enclosure.

14. A jacket isolator comprising a support, an enclosure carried by said support and formed of flexible synthetic resin film, said enclosure having an opening therein, an imperforate jacket within said enclosure formed of flexible synthetic resin film and having a sealed connection with said enclosure continuously around said opening, said jacket including a hood having a transparent portion and sleeves terminating in gloves, means for supplying air to said hood, said enclosure having an access opening therein and flexible lapping flaps adjacent said opening, and means for circulating filtered air in said enclosure at a pressure slightly above atmospheric pressure, said flaps being held in sealing face engagement by said pressure, said transparent hood portion being at least partially rigid to position the same spaced from the eyes of the wearer while said hood is subjected to air pressure in said enclosure.

15. A jacket isolator comprising an enclosure, a support positioning said enclosure spaced above floor level, said enclosure having an opening in the lower part thereof, a flexible jacket within said enclosure and having a sealed connection with said enclosure continuously around said opening, said jacket being imperforate and including a hood having a transparent portion and sleeves terminating in gloves, said sealed connection of jacket and enclosure including a tubular projection on said enclosure defining said opening, a portion of said jacket encircling said tubular projection, and means releasably anchoring said encircling jacket portion to said tubular projection, a releasable seal for the inner end of said tubular projection and means for sterilizing said tubular projection and its contents.

16. A jacket isolator comprising an enclosure, a support positioning said enclosure spaced above floor level, said enclosure having an opening in the lower part thereof, a flexible jacket within said enclosure and having a sealed connection with said enclosure continuously around said opening, said jacket being imperforate and including a hood having a transparent portion and sleeves terminating in gloves, said sealed connection of jacket and enclosure including a tubular projection on said enclosure defining said opening, a portion of said jacket encircling said tubular projection, and means releasably anchoring said encircling jacket portion to said tubular projection, an annular channel surrounding the upper end of said tubular projection and containing a liquid, and a closure removably mounted on and spanning the upper end of said tubular projection and including a marginal depending portion immersed in said liquid.

References Cited in the file of this patent

UNITED STATES PATENTS

| | | |
|---|---|---|
| 2,185,711 | Reyniers | Jan. 2, 1940 |
| 2,473,033 | Letac | June 14, 1949 |
| 2,573,414 | Dunn | Oct. 30, 1951 |
| 2,649,583 | Schaeffer | Aug. 25, 1953 |
| 2,786,740 | Taylor | Mar. 26, 1957 |